United States Patent Office 3,212,797
Patented Oct. 19, 1965

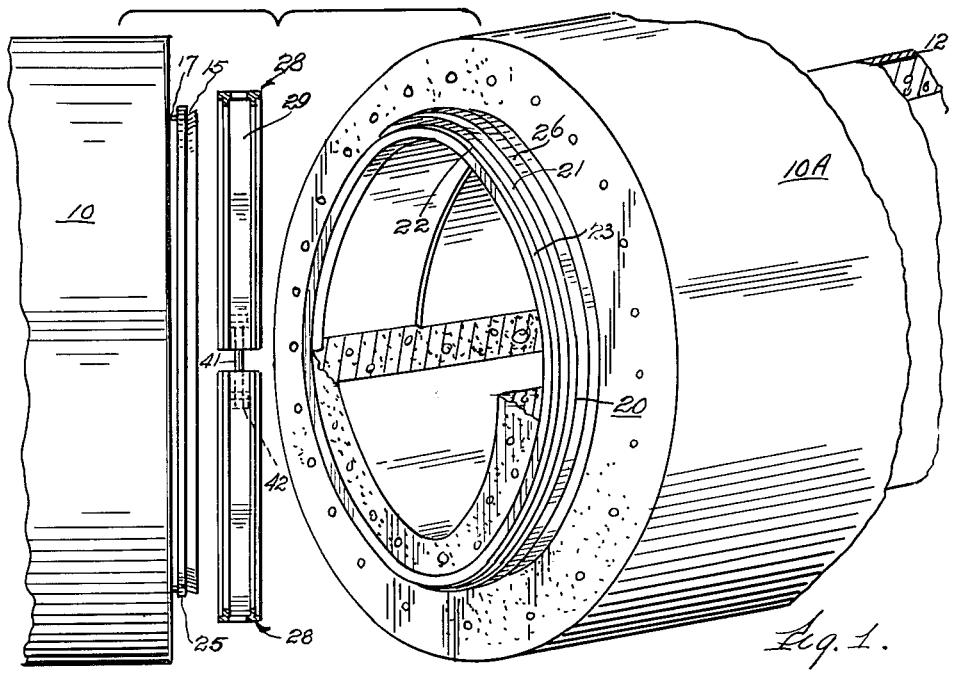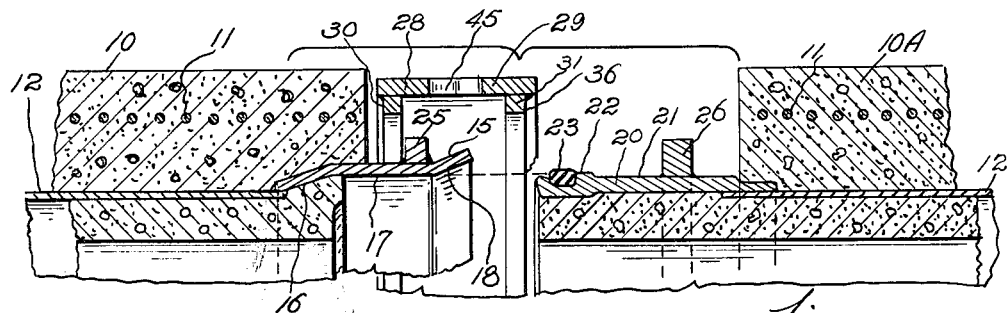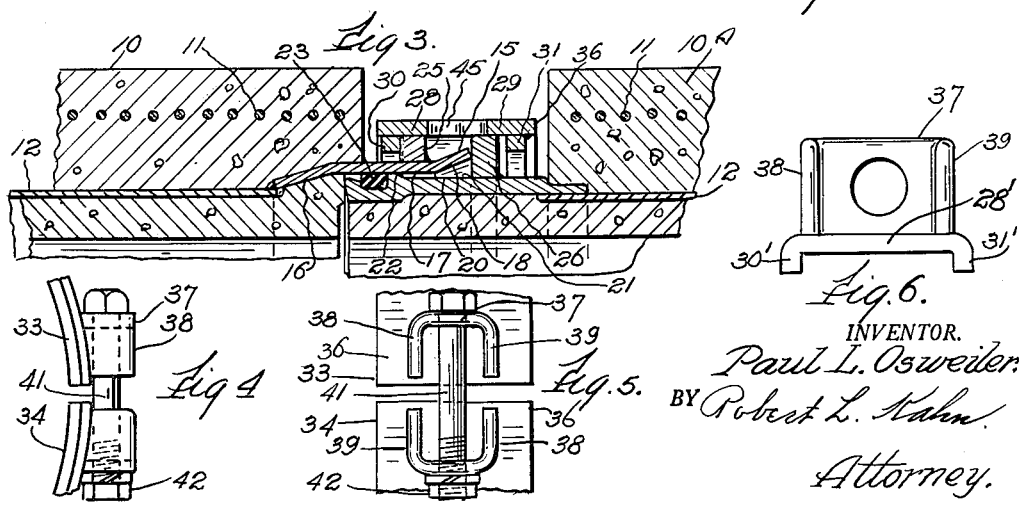

3,212,797
CONCRETE PIPE JOINT
Paul Leonard Osweiler, Dayton, Ohio, assignor to Price Brothers Company, Montgomery County, Ohio, a corporation of Michigan
Filed Oct. 2, 1956, Ser. No. 613,480
1 Claim. (Cl. 285—230)

This invention relates to a concrete pipe joint and may be applied to any type of concrete pipe.

The joint forming the subject matter of the present invention is more particularly concerned with endowing the abutting pipe ends with mechanical stability while relying on gasket means to endow the joint with sealing properties. It is well known that concrete pipe is subject to stresses and strains during and after installation. Improper bedding of the pipe or joint will result in severe strains upon the pipe and joint. In addition to the above, expansion and contraction, traffic load upon the ground over the pipe are all factors which tend to impose stresses upon pipe joints. An important factor pertaining to the use of joints is the cost and ease of application of joint structures to pipe.

In accordance with the present invention a collar construction of steel is provided, said construction cooperating with suitable portions of the opposed pipe ends to provide a strong mechanical construction. In order that the invention may be fully understood, reference will now be made to the drawings wherein an exemplary embodiment is illustrated. It is understood that variations may be made without departing from the scope of the invention except as defined by the appended claim.

In the drawings, FIGURE 1 is a perspective exploded view of the opposed pipe ends and collar illustrating a joint embodying the present invention.

FIGURE 2 is a sectional detail of the opposed pipe ends and collar prior to assembling.

FIGURE 3 is a sectional detail similar to FIGURE 2 but showing the joint in assembled form.

FIGURES 4 and 5 are side and front views respectively of the lug portions of the joint.

FIGURE 6 is a sectional detail of a modified form of a collar.

Parts of two concrete pipes 10 and 10A are illustrated. The concrete pipe may be of any desired type and by way of example is illustrated as of the cylinder type having steel wire reinforcement 11 and steel cylinder 12. As illustrated here, concrete pipe 10 has metal bell 15. This consists of anchor portion 16 within concrete, cylinder portion 17 and bell portion 18. In the type of concrete pipe as illustrated, such pipe having steel cylinder 12 within the concrete, bell 15 may be welded to the end of steel pipe 12. Where the concrete pipe is of the type which does not have steel cylinder, anchor portion 16 will be disposed within the concrete and suitably anchored therein.

Pipe 10A, which may be the same as pipe 10, may have the opposed pipe end provided with steel spigot 20. Spigot 20 is suitably anchored to the pipe and includes cylinder portion 21 and gasket supporting portion 22. Gasket supporting portion 22 has annular channel formed on the outside thereof within which flexible gasket 23 may be disposed. Gasket 23 may be of rubber or other suitable material and normally extends above the surfaces of the spigot.

The outer diameter of the spigot is somewhat smaller than the inside diameter of bell 15 so that the two may be telescoped as illustrated in FIGURE 3.

In accordance with this invention, cylindrical surfaces 17 and 21 of the opposed joint forming portions are provided with annular flanges 25 and 26 respectively. Flanges 25 and 26 may have any desired cross-sectional shape and are here illustrated as having rectangular shapes. These flanges are made by strips welded to the outer surfaces of the joint forming member and thus form outwardly extending flanges.

Cooperating with flanges 25 and 26 in the assembled joint is clamping means 28 consisting generally of one or more channel shaped members. These channel shaped members or straps are bent around the circumferences of flanges 25 and 26 and are tightened to grip the same. This clamping means 28 consists of strap 29 having inwardly directed flanges 30 and 31 adjacent the edges of the strap. The space between flanges 30 and 31 are such, that when the joint is assembled as illustrated in FIGURE 3, strap flanges 30 and 31 will lie outside of pipe flanges 25 and 26. The amount of clearance between the opposed flange faces; i.e. between the opposed faces of flanges 30 and 25 on the one hand and between the opposed faces of flanges 31 and 26 on the other hand, may range from nothing to about ½". This permits a contractor to break a joint and permits some degree of adjustment.

As is illustrated in FIGURE 3, with the bell and spigot joint some cocking may be tolerated. As a rule, there may be some departure from perfect alignment of adjacent pipe sections, as for example when a curve in the pipe line is to be provided. In such case, the clearance between the flanges will permit some slight adjustment of the adjacent pipe ends. However once the joint has been assembled, as illustrated in FIGURE 3, it is generally covered with grout, on both inside and outside, so that the entire structure is rigid.

The clamping means formed by strap 28 and flanges 30 and 31 should be sufficiently flexible so that bending around the circumference of the pipe joint is possible.

A pipe joint may have one or more lengths of clamping strap, the adjoining ends of the clamping strap being provided with lugs illustrated in detail in FIGURES 4 and 5. Thus referring to these figures, one or more lengths of clamping strap will have adjacent ends 33 and 34. Each of the ends is provided with an outwardly extending lug portion 36 having a U shape as viewed in elevation. This U-shaped lug 36 has part 37 extending parallel to the width of the strap and spaced parts 38 and 39 extending lengthwise of the strap. Part 37 of each of the strap lugs is suitably apertured to accommodate bolt 41. Bolt 41 has nut 42. Thus opposed ends 33 and 34 of one or more clamping straps will have the strap lugs 36 opposed to each other to permit bolt 41 to be threaded through the apertured portions. Thus bolt 41 and nut 42 will be used to tighten the straps in the same general manner as in conventional hose clamps.

It is also possible to have portions 38 and 39 spaced differently on one strap end than the other and thus permit some telescoping to occur. It is also possible to reverse one or both of portions 36 so that side portions 38 and 39 extend away from each other rather than toward each other.

In FIGURE 6, is shown a modification wherein strap 28' has flange portions 30' and 31' integral therewith and extends inwardly to form a channel.

By controlling clearances, the amount of pipe departure from a straight line may be controlled. An intermediate part of a clamping channel may be apertured at 45 to accommodate grout which may run into the joint after the joint has been assembled. As has been previously indicated the exterior of the entire joint construction will also be covered with grout or other suitable material to protect the joint against corrosion.

What is claimed is:

A joint construction for concrete pipe comprising a steel bell attached to an end of one pipe and extending axially beyond the concrete, said bell having a cylindrical portion terminating in an outwardly flaring end portion, said other pipe end having a steel spigot of cylindrical construction, said spigot having an annular gasket seated in a groove around the outside adjacent the free end of the spigot, said spigot having an outer diameter somewhat smaller than the inside diameter of the cylindrical portion of the bell so that said bell may telescope said spigot with the gasket providing a seal at an annular region between the bell and spigot surfaces, said bell having an annular flange rigidly attached thereto on the outer surface of the cylindrical part of the bell adjacent the flaring end portion, said spigot having an annular flange rigidly attached thereto on the outer surface thereof inwardly from the free end of the spigot, said two flanges having substantially equal outer diameters, a split clamping ring having a generally U-shaped section transversely thereof, said split ring enclosing the telescoped portions of the bell and spigot with the ring being wide enough so that the inwardly directed sides of the ring have between them the two flanges, the inside diameters of the sides of the ring being smaller than the outside diameter of said flanges and bolt means cooperating with the ends of said split ring for drawing the ring tightly and maintaining the telescoped parts in position as a joint, said split ring and flanges cooperating to permit some cocking of two adjacent pipe lengths without impairing the tightness of the joint.

References Cited by the Examiner

UNITED STATES PATENTS

| | | | |
|---|---|---|---|
| 1,293,163 | 2/19 | Mitchell | 285—288 |
| 1,575,180 | 3/26 | Perkins | 285—230 |
| 1,609,660 | 12/26 | Phelps | 285—288 |
| 1,652,418 | 12/27 | Sherrerd | 285—288 |
| 1,703,725 | 2/29 | Cromwell | 285—374 |
| 1,739,472 | 12/29 | Sweney | 285—288 |
| 1,967,467 | 7/34 | Damsel | 285—365 |
| 1,976,589 | 10/34 | Trickey | 285—230 |
| 2,274,439 | 2/42 | Tinker | 285—416 |
| 2,277,990 | 3/42 | Lanninger | 285—374 |
| 2,698,193 | 12/54 | Kennison | 285—288 |
| 2,716,563 | 8/55 | Seneschall | 285—374 |

FOREIGN PATENTS

| | | |
|---|---|---|
| 496,141 | 9/53 | Canada. |
| 1,084,340 | 7/54 | France. |
| 2,057 | 5/80 | Great Britain. |
| 17,760 | 7/10 | Great Britain. |
| 680,721 | 10/52 | Great Britain. |

CARL W. TOMLIN, *Primary Examiner.*

ARTHUR B. MILLER, *Examiner.*